United States Patent [19]

King

[11] Patent Number: 4,928,461
[45] Date of Patent: May 29, 1990

[54] FRUIT PICKING ASSEMBLY

[76] Inventor: John S. King, 16500 SW. 102 Ct., Miami, Fla. 33157

[21] Appl. No.: 244,837

[22] Filed: Sep. 15, 1988

[51] Int. Cl.⁵ .......................................... A01D 46/24
[52] U.S. Cl. ........................................ 56/339; 56/332
[58] Field of Search .......................... 56/332–340; 403/108

[56] References Cited

U.S. PATENT DOCUMENTS

| | | | |
|---|---|---|---|
| 55,150 | 5/1866 | Newcomb | 56/339 |
| 132,634 | 10/1872 | Colthar | 56/339 |
| 441,971 | 12/1890 | Potterf | 56/340 |
| 600,256 | 3/1898 | Cady | 56/340 |
| 776,961 | 12/1904 | Terry | 56/333 |
| 787,164 | 4/1905 | Fisher, Jr. | 56/340 |
| 1,109,645 | 9/1914 | Slatton | 56/338 |
| 1,619,731 | 3/1927 | Hughes | 56/339 |
| 2,771,701 | 11/1956 | Harper et al. | 56/331 |
| 2,900,780 | 8/1959 | Kaiser | 56/339 |
| 3,319,846 | 5/1967 | Wolf | 403/108 |
| 3,426,367 | 2/1969 | Bradford | 403/108 |
| 3,947,140 | 3/1976 | Thomas | 403/108 |
| 4,242,856 | 1/1981 | Patton | 56/339 |
| 4,471,614 | 9/1984 | Soffer | 56/339 |

Primary Examiner—Paul J. Hirsch
Attorney, Agent, or Firm—Malloy & Malloy

[57] ABSTRACT

A picking head and/or support frame for a fruit or like produce containing bag designed to be attached to the distal end of an elongated pole or shaft and including a cutting blade mounted thereon such that a worker may extend the bag and picking head to an elevated position so as to reach oranges or like fruit within a tree and easily sever the stem of such fruit so that it will be captured within the bag after being cut from the tree and wherein the picking head includes a support frame produced from a preferably one piece, high strength, light weight, moldable material.

15 Claims, 1 Drawing Sheet

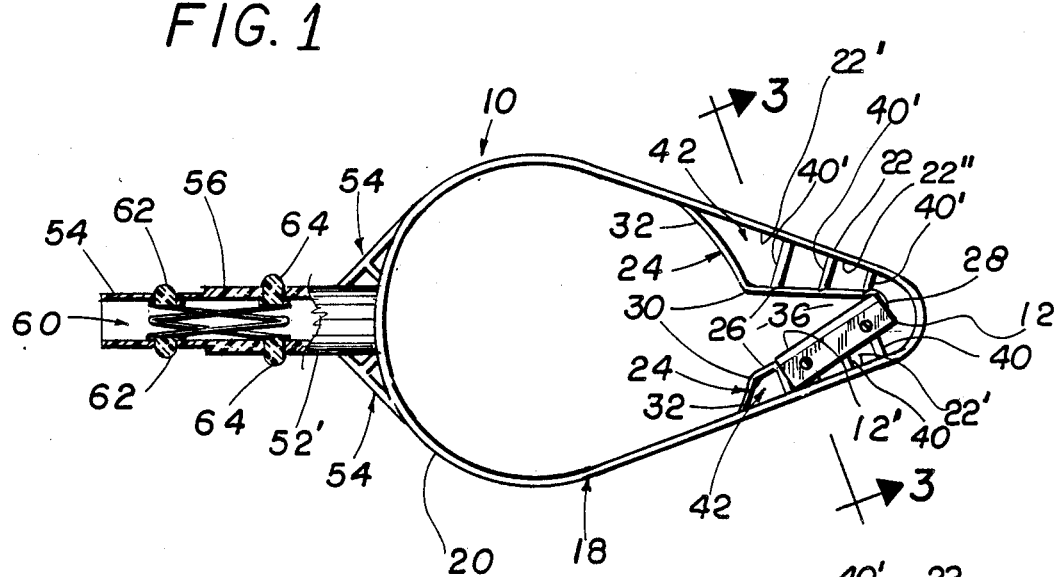
FIG. 1
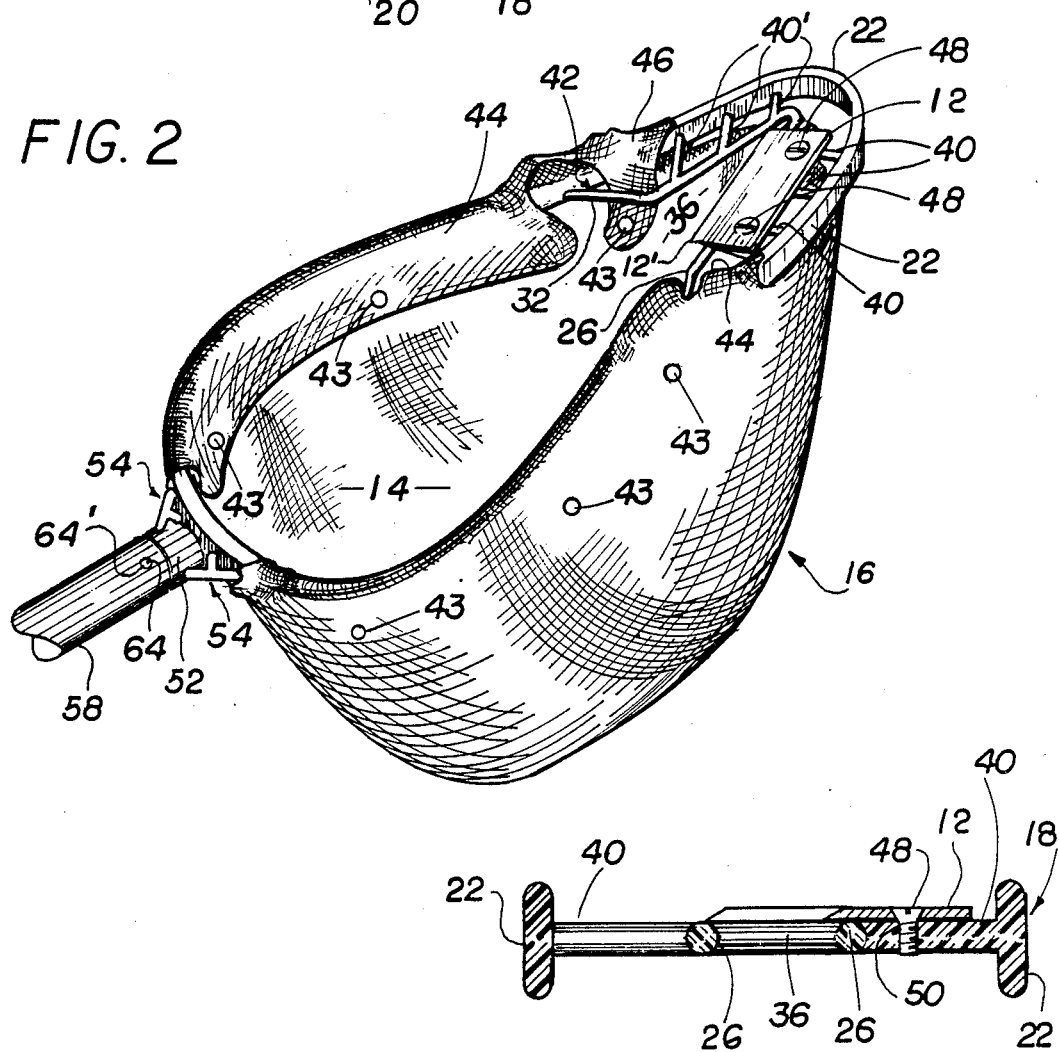
FIG. 2
FIG. 3

FRUIT PICKING ASSEMBLY

BACKGROUND OF THE INVENTION

1. Field of the Invention

This invention relates to a support frame defining a picking head on which a substantially conventional containment bag is secured such that the bag and head having a cutting member thereon is extendable by an elongated pole handled by a worker to elevated heights so as to pick fruit or like produce from trees in an efficient manner.

2. Description of the Prior Art

Typically, the use of elongated poles with some type of containment bag or like structure are used by workers to harvest fruit from trees at elevated heights. It is known in the prior art to attach some type of cutting blade to some portion of the containment bag support in order to sever the stem of the fruit thereby allowing the fruit to fall into the containment bag. While such known and extensively used devices are considered to be operable for their intended function, it is generally accepted that the structure of these devices is somewhat antiquated.

The patent to Patton, 4,242,856, discloses a fruit harvesting assembly of the type including an elongated handle used to cut and collect fruit hanging from trees at a substantial distance above the ground. A support frame of the device is secured to a containment bag wherein the frame is made from multiple pieces of elongated metallic, heavy gage wire or like material which is bound together and bent into a particular configuration. Patton declares that this structure is efficient for viewing the proper cutting angle and/or stem being cut in order to prevent damage to the fruit. More specifically, the structure of the Patton device includes a base portion and a head portion specifically aligned in substantially co-linear relation to the longitudinal axis of the handle wherein a cutting blade is arranged in an angular, declining relation to the aforementioned linear alignment. This is provided to allow simultaneous positioning of the cutting blade transversely or substantially perpendicular to the stem of the fruit being cut and the support arm in an out-of-way location so as to provide a clear viewing engagement of the cutting blade and the stem portion of the fruit being cut. It is also important to note that the blade is located across the head portion of the support frame and is effectively welded or fixed thereto such that removal for purposes of replacement, such as when the blade is damaged or becomes dull is difficult or impossible.

The patent to Terrill, 598,401, discloses a fruit picker of substantially similar construction including a rim portion formed of a malleable cast metal or other thin and light material and has an outer extension thereon for the support of a containment sleeve or bag. The bag is selectively opened or closed at the distal or inner end thereof so as to allow collection and subsequent release of the contained fruit once severed or picked from the tree.

As set forth above, prior art devices of the type outlined in the aforementioned patents were operable for their intended function. However, improvement both in material, design, and construction, would add to the efficiency of such devices, increase the operable life even under harsh conditions of the operation and allow the picking head portions of the device to become lighter while not sacrificing any structural integrity. The weight of a support frame is a serious consideration to the workers in the field which gather many pieces of fruit before emptying those cut from the tree.

SUMMARY OF THE INVENTION

The present invention relates to a fruit picking assembly and more specifically to a picking head incorporating a support frame for a containment bag in which the fruit drops after being severed from a tree. Particularly, the subject assembly is useable by workers to harvest or pick fruit at elevated heights such as but not limited to tree grown fruit such as oranges, grapefruit, etc.

The assembly comprises a continuous, substantially curvilinear and elongated support frame having a base portion with an opening of sufficiently large transverse dimension to allow the fruit being picked to pass therethrough. The base portion is integrally connected into a one-piece construction with a somewhat elongated nose portion communicating with the base portion but defining the outwardly extending or distal end of the support frame. The support frame is specifically structured to have removably attached thereto the continuous periphery of the fruit containing bag in which the fruit drops once it is separated from the tree. Typically, conventional fruit containing bags or picking bags include a plurality of connectors spaced along the length of the periphery, such as snap connectors wherein a peripheral portion of the bag surrounds the support frame, along its length. Cooperative members of the snap connectors are secured to one another such that the peripheral portion of the bag surrounds the support frame in supported relation thereby. The frame is structured to include a retaining portion which engages a portion of the periphery of the bag in a manner which will effectively prevent it from slipping or being inadvertently displaced along the length thereof generally towards the base portion. The end of the support frame is connected to the elongated pole used by workers to position the bag and support frame in an elevated position for the gathering of the fruit on the trees. The sliding or gravitating of the bag along the support frame toward the pole is particularly prevalent when the bag is at least partially filled with the heavier fruit. When the bag and picking head are raised to the elevated position to gather fruit, it is oriented at a somewhat angled position which facilitates, due to gravity, the tendency of the bag to slide along the length of the support frame towards the base portion as set forth above. However, the retaining means serves to retain a portion of the periphery of the bag in a manner which prevents or reduces the tendency of such slippage thereby maintaining the bag in an operative position regardless of the amount or number of pieces of fruit contained therein.

An important feature of the assembly includes the existence of a cutting blade removably secured to the support frame in a location which places the cutting edge of the blade in interruptive, severing relation to the stem of the fruit when such fruit passes substantially into the interior of the bag through the base portion of the support frame. Proper positioning of the stem to be severed is accomplished through the provision of a guide means secured along the length of the nose portion and substantially interiorly thereof and spaced inwardly in properly supported relation from the length of the support frame defining the nose portion.

More specifically, the aforementioned guide means is more clearly defined by two spaced apart guide rails which define a guide channel along which the stem is forced to pass into the aforementioned interruptive, severing relation to the cutting edge of the cutting blade. The guide rails define a guide channel having an open end communicating directly with the base portion and thereby allowing entrance of the stem into the guide channel. The opposite end of the guide channel is closed thereby orienting the guide rails in a somewhat convergent relation to one another. Another feature of the present invention is the angular or off-center orientation of the channel 6 relative to an imaginary longitudinal axis of the support frame generally and more specifically the nose portions of the support frame. This off-center orientation will provide a more efficient exposure of the cutting edge of the cutting blade along a greater distance of the channel as will be more fully explained hereinafter.

A brace means is provided to ensure proper structural integrity of the guide rails which are frequently subjected to stresses during manipulation of the support frame and particularly the nose portion thereof to accomplish proper orientation and positioning of the fruit and the stem relative to the cutting blade and the interior of the containment bag for the fruit.

The opposite end of the support frame has mounted thereon an elongated attachment portion or shank designed to fit concentrically within a hollow end of an elongated pole and further including connecting means used to removably attach the picking head to the pole.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which:

FIG. 1 is a top view in partial cut-away and section of the picking head and support assembly of the present invention.

FIG. 2 is a perspective view of the subject assembly attached to an elongated positioning pole and having a fruit containing bag removably secured thereto in a retaining position.

FIG. 3 is a sectional view along line 3—3 showing details of the removable connection of a cutting blade to the head in a preferred, operative manner.

Like reference numerals refer to like parts throughout the several views of the drawings.

DETAILED DESCRIPTION OF THE PREFERRED EMBODIMENT

As shown in FIGS. 1 and 2, the present invention is directed towards a fruit picking assembly including a picking head and support assembly generally indicated as 10. The assembly includes a cutting blade 12 contained thereon for the severing of the stems of fruit or like produce so as to separate such fruit from the tree and allow it to fall into the interior 14 of a fruit containing structure or bag 16. The bag 16 is removably secured in supported, somewhat dependent relation to a support frame 18 which has a substantially curvilinear or semicircular base portion 20 integrally connected to a somewhat elongated nose portion 22 defining what may be considered an outer or distal end of the support frame 18. As set forth above, a preferred embodiment of the preferred invention comprises the support frame including the base portion and nose portion 20 and 22 respectively formed of an integral, one-piece construction preferably from a lightweight but high strength material such as plastic or the like. The transverse dimension of the base portion 20 is sufficiently great to allow passage therethrough of an average piece of fruit such as an orange, grapefruit, etc. However, the nose portion 22 is somewhat narrowed and elongated and includes a guide means generally indicated as 24 including two elongated guide rails 26 arranged in spaced apart relation to one another along their length but oriented in a substantially convergent relation to one another and thereby including a closed or convergent end 28 and an open divergent end 30. Leading end portions 32 may also be provided as an integral part of the guide rails 26 and being angularly oriented towards the elongated channel 36 so as to properly guide and direct the stem portions of fruit into the channel 36 and into serving, interruptive relation to the cutting edge 12' of the cutting blade 12. The cutting blade 12 as well as the cutting edge 12' thereof is substantially angulary oriented relative to the central longitudinal axis of the guide channel 36 so as to provide an elongated exposure of the length of the cutting blade 12' along a major portion of the length of the channel 36. It should also be emphasized that the channel 36 is off-center or angularly oriented relative to an imaginary central longitudinal axis of the support frame 18, generally, and the nose 22 more specifically. this off-center orientation provides a greater exposure of substantially the entire length of the cutting edge 12'. Also, positioning of the cutting edge 12' in the manner shown clearly in FIGS. 1 and 2 serves to more effectively cut the stem as it passes along the length of the off-center channel 36. This facilitates and renders more efficient the severing of the stem portion of the fruit once the fruit itself enters through the base portion 20 and into the interior 14 of the fruit containment bag 16.

An important feature of the present invention is the existence of brace means serving to interconnect the guide rails 26 to the support frame 18 along a major portion of the length of the nose portion 22. The brace means includes a plurality of spaced apart brace members 40 and 40' each having one end integrally secured to an inner surface of the nose portion of the support frame 18 as at 22' (see FIG. 1) and the opposite end integrally secured to a correspondingly positioned one of the two guide rails 26. By virtue of this construction, the guide rails 26 are securely disposed in spaced relation to one another and in an inwardly spaced relation to the inner surface of the nose portion at 22'. Due to the angular off-center orientation of channel 36 relative to the length of the nose portion 22, brace members 40' decrease in length as they are successively positioned from the open end 30 to the closed end 28 of the channel 36. To the contrary, brace members 40 increase in length from the open end 30 to the closed end 28 as shown in both FIGS. 1 and 2 to accommodate the off-center orientation of channel 36 as shown.

A retaining means is defined at least in part by the brace members 40 and 40' as well as the specific disposition of the guide rails 26 and the leading portions thereof as at 32. More specifically, the retaining means comprises two spaced apart open pockets generally indicated as 42 having the boundaries defined in part by a corresponding positioned ones of the brace members 40, and 40' the leading end of the guide rail 32, the corresponding guide rail itself 26 and a correspondingly positioned portion of the length of the nose portion 22 of the support frame 28. These open pocket is disposed, configured and dimensioned to allow passage therethrough of a portion 46 of the periphery 44 of the bag 16. Connected to the portion 46 is a snap-like connector as at 43 such that the portion 46 will be attached through the open pockets 42 thereby preventing sliding or slipping of the periphery 44 along the length of the support frame 18. Such slippage is due to gravity, especially when the interior 14 of the bag 16 is at least partially filled with fruit already picked. It should be emphasized that FIG. 2 is in effect a cut-away view in order to clearly demonstrate that the peripheral segment 46 as part of the periphery 44 clearly is forced to pass through the open pocket 42 for interconnection of the snap-like connector 43. It should be emphasized, however, that the cut-away view as shown in FIG. 2 particularly the peripheral portion 44 of bag 16 is for purpose of explanation only. The periphery 44 is meant to be a continuously formed periphery extending in overlapping relation along substantially the entire length of the support frame 18 including the base portion 20 and the nose portion 22. Also, it should be noted that a plurality of such snap-like connectors 43 are located in spaced relation to one another along the length of the continuously formed periphery 44 so that the overlapping supporting disposition of the periphery 44 along the length of the support frame 18 may be easily accomplished while allowing for removable attachment of the bag to the frame in a manner which should be apparent.

Other features of the invention include a mounting means for the cutting blade 12 including at least one but preferably a plurality of connectors 48 each passing through an aperture in the blade 12 and into a receiving socket or aperture as at 50 formed in the brace means or at least one or more of the brace members 40 as shown in greater detail in FIG. 3. This allows for the proper orientation of the cutting edge 12' of the blade 12 while allowing its ease of removal for sharpening or replacement.

The opposite end of the support frame 18 in the area of base portion 20 includes an outwardly extending elongated mounting shank or the like 52 which also may be integrally secured to the support frame as shown. A supplementary brace member 54 may be secured to the outer surface of the base portion 20 of the frame 18 as shown at one end thereof wherein the opposite end is integrally as secured to an outer surface of the shank 52. It should be noted that the shank 52 has a first length 54 being of one transverse dimension and a second length 56 being of a greater transverse dimension so as to fit substantially telescopically or concentrically within a hollow interior of an elongated hole or the like 58 used to elevate and raise the assembly including the support frame 18 and container 16 to a height where the various pieces of fruit being severed may grow.

A connecting means generally indicated as 60 is mounted at least partially within the interior of the elongated shaft 52 and includes two pairs of nipples 62 and 64 normally biased outwardly through correspondingly positioned aperture pairs wherein such nipples 62 or 64 may cooperate with appropriately formed apertures as at 64' in the hollow end of the pole 58 so as to provide a removable connection as clearly shown in FIGS. 1 and 2.

Now that the invention has been described,
What is claimed is:

1. A picking head and support assembly for a fruit containing bag designed to be secured to an elongated pole, said assembly comprising:
    a. a support frame having a continuous, substantially elongated and curvilinear configuration including a nose portion formed on and defining a distal end thereof and a base portion formed on and defining a proximal end thereof,
    b. said support frame structured to support the fruit containing bag thereon and being disposed in supporting engagement with an open peripheral portion of the bag; said base portion having a greater transverse dimension than said nose portion and being of sufficiently large dimension to allow a piece of fruit being cut to pass therethrough,
    c. a guide means mounted on said nose portion and disposed and configured for guiding a stem of the fruit into a cutting portion,
    d. said guide means comprising two elongated guide rails located interiorly of said support frame and extending along at least a majority of the length of said nose portion, said guide rails defining an elongated channel having an open end communicating directly with said base portion and a closed end oppositely disposed to said open end, said channel disposed at an angular, off-set relation to a central longitudinal axis of said nose portion,
    e. a cutting blade connected to said support frame in an angular orientation to the length of said channel and including a cutting edge thereof extending angularly along at least a majority of the length of said channel, and
    f. a retaining structure mounted on said guide means in retaining engagement with the peripheral portion of the bag and being disposed and configured to maintain the bag in an operative fruit-retaining position.

2. An assembly as in claim 1 wherein said support frame and said guide means are made from a plastic material of an integral one-piece construction.

3. An assembly as in claim 1 wherein said guide rails being disposed in spaced relation to one another along a majority of their length and in interruptive relation to said blade.

4. An assembly as in claim 3 further comprising brace means disposed in interconnecting relation between said frame and said rail for strengthening said guide rails.

5. An assembly as in claim 4 wherein said brace means comprises a plurality of spaced apart brace elements disposed in interconnecting relation at opposite ends to an inner surface of said frame and respective ones of said guide rails.

6. An assembly as in claim 5 further comprising mounting means formed on said brace means and structured for supporting attachment with said cutting blade, said mounting means disposed to orient a cutting edge of said cutting blades in interruptive relation to a stem passing along the length of said guide means between said guide rails.

7. An assembly as in claim 6 wherein said mounting means comprises at least one receiving socket formed on one of said brace elements and dimensioned and configured to receive a connector element therethrough, the connector element engaging said cutting blade and extending therefrom through said receiving socket into fixed attachment with said one brace element.

8. An assembly as in claim 3 wherein said two elongated guide rails are disposed in converging relation to one another and further includes spaced apart free ends communicating directly with said base portion and in receiving relation to a stem to be cut as it passes from said base portion towards the opposite ends of said guide means, between said guide rail and into cutting engagement with said cutting blade.

9. An assembly as in claim 1 wherein said retaining structure comprises an open pocket formed between each of said guide rails and a corresponding portion of said support frame and being of sufficient configuration and dimension to receive a peripheral segment of the peripheral portion of the fruit containing bag to pass therethrough into secured, supporting relation about said support frame, said peripheral segment disposed in retained engagement relative to said guide means and said fruit containing bag being maintained in an operative position thereby. at one end to inner surfaces of said support frame adjacent said nose portion and at the opposite end to respective ones of said guide rail; said open pocket adjacent each of said guide rails having a periphery defined by a respective one of said guide rails, spaced apart brace members and a corresponding length of said support frame.

10. An assembly as in claim 1 wherein said support frame comprises an attachment member structured for securement to an elongated shaft and insertable within a hollow end portion thereof, said attachment portion comprising an elongated, stepped configuration having a first, lesser transverse dimension extending along a first length of said attachment portion and a second, greater transverse dimension extending along a second length of said attachment portion, whereby said attachment portion can be fitted to one of a plurality of shafts of varying transverse dimension.

11. An assembly as in claim 10 further comprising a connecting means mounted on the interior of said attachment portion and structured for removable interconnection of said attachment portion to the elongated shaft.

12. An assembly as in claim 1 further comprising brace means disposed in interconnecting relation between interior surface portions of said nose portion and each of said guide rails.

13. An assembly as in claim 12 wherein said brace means comprises a first plurality of brace members disposed in interconnecting relation between one guide raid and a corresponding side of said nose portion and a second plurality of brace members disposed in interconnected relation between an opposite guide rail and a corresponding side of said nose portion.

14. An assembly as in claim 13 wherein said first plurality of base members comprise successively increasing lengths as they are disposed from said open end to said closed end in spaced relation to one another, said second plurality of brace members comprise successively decreasing 15. An assembly as in claim 12 wherein said brace means comprises a plurality of spaced apart brace members connected at one end to inner surfaces of said support frame adjacent said nose portion and at the opposite end to respective ones of said guide rail; said open pocket adjacent each of said guide rails having a periphery defined by a respective one of said guide rails, spaced apart brace members and a corresponding length of said support frame.

* * * * *